F. A. LANE.
MILKING MACHINE.
APPLICATION FILED MAY 22, 1909.
979,174.
Patented Dec. 20, 1910.
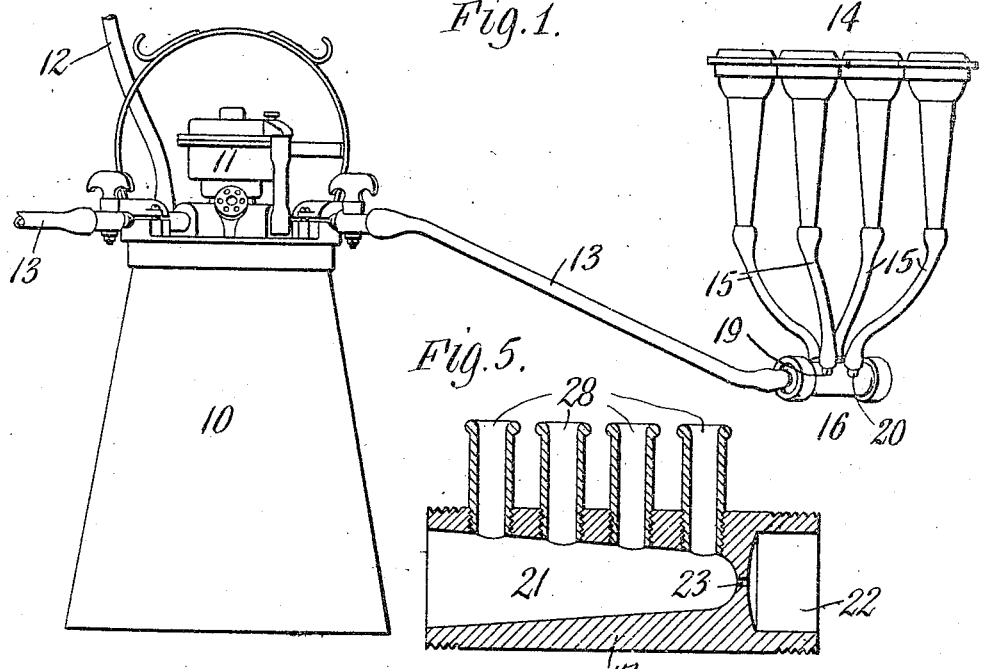
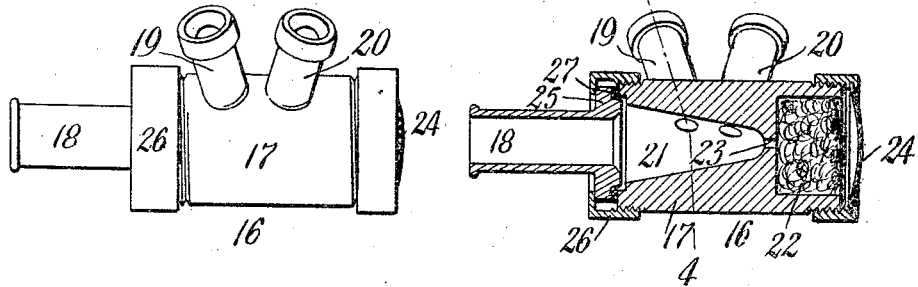
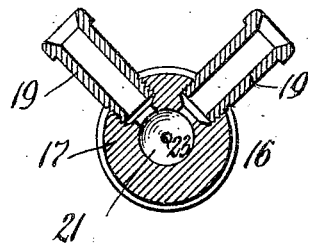
Witnesses:
E. A. Volk.
A. G. Dimond.
Inventor
Frederic A. Lane,
By Wilhelm Parker & Hand,
Attorneys.

UNITED STATES PATENT OFFICE.

FREDERIC A. LANE, OF LITTLE FALLS, NEW YORK, ASSIGNOR TO D. H. BURRELL & COMPANY, OF LITTLE FALLS, NEW YORK.

MILKING-MACHINE.

979,174. Specification of Letters Patent. Patented Dec. 20, 1910.

Application filed May 22, 1909. Serial No. 497,590.

*To all whom it may concern:*

Be it known that I, FREDERIC A. LANE, a citizen of the United States, residing at Little Falls, in the county of Herkimer and State of New York, have invented a new and useful Improvement in Milking-Machines, of which the following is a specification.

This invention relates to that class of milking machines which comprise teat cups to which suction is applied and in which each set of teat cups, usually four, is connected with a pipe leading to the milk pail by a connector or coupling which is provided at its front or delivery end with a main suction nipple for connection with the milk pipe leading to the pail, and rearwardly of its delivery end with a plurality of nipples for connection with the pipes leading from the teat cups to the connector. In this class of machines, the suction is usually applied to the milk pail and acts from the latter through a pulsator valve intermittently upon the pipe extending from the pail to the connector and from the latter through the individual pipes to the several teat cups. Air is admitted to the connector constantly for relieving the partial vacuum in the cups when the suction is cut off by the pulsator valve, but the air inlet is so restricted that the suction effect is not materially impaired by this admission of air when the pulsator valve is open. A milking machine of this general character is described and shown in my Patent No. 828,613, August 14, 1906.

The objects of this invention are to improve the construction of the connector in such a way that the suction is applied efficiently, evenly and satisfactorily to the teats, that a large chamber is provided within the connector for filtering the air which is admitted to the same, and that the parts of the connector can be readily separated for cleaning.

In the accompanying drawings: Figure 1 is an elevation of a milking machine embodying this invention, the figure representing one set of teat cups connected with the pulsator and pail by the improved connector. Fig. 2 is a side elevation of the connector. Fig. 3 is a longitudinal sectional elevation thereof. Fig. 4 is a cross section, in line 4—4, Fig. 3. Fig. 5 is a longitudinal section, showing a modified arrangement of the nipples.

Like reference characters refer to like parts in the several figures.

10 represents the milk pail, 11 the pulsator mounted on the same, 12 the main suction pipe which connects the pail with a vacuum pump or other exhaust apparatus of usual construction, (not shown), 13 the two main milk pipes connected with the pulsator in the usual way, one pipe for each set of teat cups, 14, 15 the individual teat cup pipes, and 16 the connector by means of which these individual pipes are placed in communication with the main milk pipe 13.

17 represents the body of the connector which has the form of a horizontal cylinder and is provided at its front end with a main suction nipple or short tube 18 for connection with the main milk pipe 13, and in its upper portion with two upwardly projecting front nipples 19 and two similar nipples 20, for connection with the four individual teat cup pipes 15. The cavity 21 of the body tapers or contracts from the front end of the body, to which the suction is applied, rearwardly, so that the front teat cup nipples 19 open into the cavity at a greater distance from the axis thereof than the rear nipples, or in other words, the front nipples 19 open into a portion of the cavity which has a larger area of cross section than that portion into which the rear nipples open.

22 represents a chamber for filtering material formed in the rear portion of the body, and 23 represents an air passage leading from said chamber into the narrow rear portion of the cavity of the body. This filter chamber is provided with a perforated cap 24 by which the filtering material, which may be cotton or other fibrous material, is confined in the chamber and through which the air is admitted to the latter.

The main suction nipple 18 is preferably made separate from the body and removably secured thereto by any suitable means, for instance, as shown, this nipple may be provided at its rear end with a flange 25 which is secured to the front end of the body by a screw cap 26, a packing ring 27 being interposed between the flange and the end of the body. Upon detaching the main nipple and removing the cap of the filter chamber the parts can be thoroughly cleaned.

The air jet which flows into the cavity of the body through the inlet passage 23 during the relief period when the suction is cut off from the teat cups, spreads in the cavity and readily enters the teat cup nipples, quickly relieving the vacuum in the same and in the teat cups.

During the suction period, when the suction is applied to the main nipple, the suction is equalized to a large extent upon the front and rear teat cup nipples by reason of the rearwardly contracted form of the cavity. This equalization of the suction effect avoids excessive suction on the front nipples, and a weaker suction on the rear nipples. An excessive suction is objectionable because it hardens the teats and causes discomfort to the cow, and an insufficient suction is objectionable because it does not cause the milk to flow fast enough and does not milk dry.

The cavity or milk flow space of the connector properly accommodates the milk entering from both pairs of nipples. The milk passes from the rear nipples into the narrow rear portion of the cavity and the milk passes from the front nipples into the wider front portion, which is in part occupied by milk coming from the rear nipples, and this milk passes to the main suction nipple, together with the air which is drawn into the cavity through the passage 23. When the flow of milk is comparatively small there is considerable vacant space, not occupied by milk, in the cavity and the suction acts more energetically upon the teat cups, while when the flow is copious the action of the suction is correspondingly smaller. The suction effect adjusts itself automatically in this manner to a certain extent to the freedom with which the milk is given off by the cow.

In the connector represented in Fig. 5, the nipples 28, instead of being arranged in pairs, are arranged in a longitudinal row between the delivery end, which is herein called the front end, of the connector and the rear end where the air is admitted.

I claim as my invention:

1. A connector for milking machines, comprising a main suction passage at one end, a flow space for the milk contracted rearwardly from said passage, and teat cup nipples opening into said flow space at different distances from said passage, the front nipples opening into a portion of the cavity which has a larger area of cross section than the portion into which the rear nipples open, substantially as set forth.

2. A connector for milking machines, comprising a body portion having a rearwardly contracted flow space open at its front end and having a filter chamber formed in its rear portion and communicating by an air passage with the small rear end of said space, a main suction nipple provided with a flange at its rear end, a screw collar by which said nipple is secured to the front end of said body, and a cap covering the rear end of said filter chamber, substantially as set forth.

Witness my hand in the presence of two subscribing witnesses.

FREDERIC A. LANE.

Witnesses:
 GEO. W. BELLINGER,
 LOOMIS BURRELL.